Figure 1:
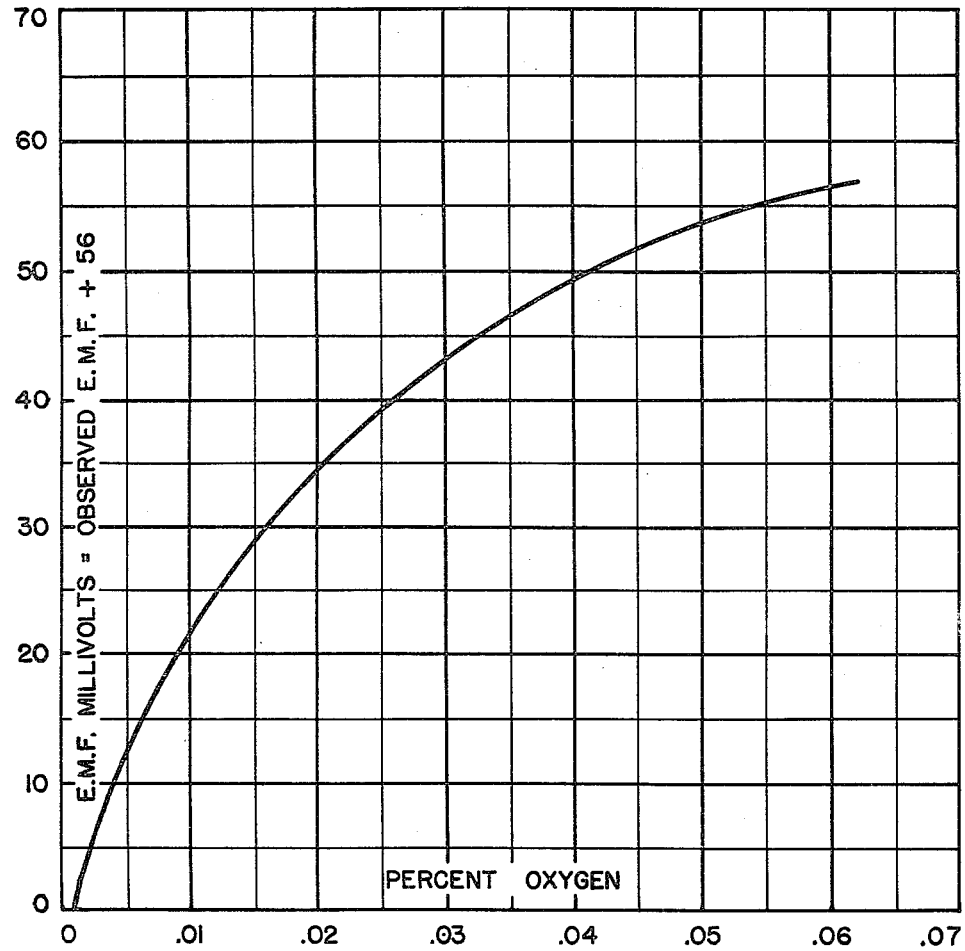

United States Patent Office

2,943,984
Patented July 5, 1960

2,943,984

CONTROL OF OXYGEN IN METALS OF GROUPS IV-B, V-B, VI-B, AND THEIR ALLOYS

William W. Gullett, College Park, Md., assignor to Chicago Development Corporation, Riverdale, Md., a corporation of Delaware Filed Oct. 22, 1958, Ser. No. 769,037

1 Claim. (Cl. 204—1)

This is a continuation in part of application, Serial No. 655,834, filed April 29, 1957.

It has for its object the determination of oxygen in solid solution in metals of groups IV-B, V-B and VI-B of the periodic system, that is, Ti, Zr, Hf, Cr, Mo, V, Nb, Ta and W. Particularly it has for its object the provision of a method for determining oxygen in solid solution in said metals without interference from combined oxygen or from the more common impurities such as iron.

I have found that in a specifically defined electrolyte the potential of a cell having an electrode of the pure metal under test and an electrode of the metal containing oxygen in solid solution is a function only of the amount of oxygen in solid solution. The cell potential is related to the percent oxygen in solid solution by the following formula $$E = A + B \log \text{percent } O_2 \tag{1}$$

where E is the cell potential in millivolts, A and B are constants characteristic of the electrolyte and the metal.

In the following discussion, the applicant's explanation of this equation will be set forth; this explanation is, however, not a part of the invention which may be practiced by observing the following procedure:

(1) Maintain the electrolyte in an inert atmosphere and consisting of at least one molten alkalinous chloride having dissolved therein 1–10% of the metal under test as a chloride of mixed valence and alkalinous metal.

(2) Measure the cell potential of the pure metal against at least three samples of the metal containing known oxygen in solid solution.

(3) Determine the constants A and B of the above equation which can readily be done graphically by plotting log percent oxygen against cell potential. In such a plot the intercept on the cell potential axis is A and the slope of the line is B.

It will be clear that having thus determined A and B for the metal and electrolyte being used, we are ready for step 4.

(4) Measure the cell potential of the pure metal against the sample in which oxygen is to be determined. Then calculate the oxygen content for the alloy in which oxygen percent is to be measured. The constants A and B are determined in the manner heretofore defined and the oxygen percent calculated from Equation 1.

The practice of my invention depends on the specific electrolyte defined herein, in this electrolyte only the oxygen in solid solution has an effect on the cell potential, unless certain unusual impurities are present. Such impurities are Mn, V and Al. When these alloys are present, the measurement of cell potential is made in the same way against an oxygen-free alloy containing the percent of Mn, V or Al respectively.

For the sake of brevity, I will illustrate my invention for the specific case of titanium group metals. It is to be understood, however, that the other metals in groups IV-B, V-B and VI-B behave in an identical manner.

In my application, now abandoned, Serial No. 439,160, filed June 24, 1954, I have disclosed that the parameter of anode potential in fused salt electrolytes is a function of interstitial oxygen content of titanium alloys and that this parameter also controls the response of certain titanium alloys to heat treatment.

My present invention relates to improved methods for measuring the electrode potential of metals containing interstitial oxygen.

I have found that the E.M.F. generated between two electrodes of a titanium group metal containing different amounts of interstitial oxygen is a definite function of the difference of interstitial oxygen contents.

For convenience, one of these electrodes may be a titanium group metal containing less than .001% oxygen. The E.M.F. of such a cell is then directly related to the oxygen content.

I have found that the E.M.F. of such a cell is stable and reproducible if the electrolyte is composed of at least one fused alkalinous metal halide having dissolved therein 3–5% titanium metal chloride with an average valence of 2.1–2.5 and a significant amount of free alkalinous metal and if said electrolyte is saturated with the dioxide of the titanium group metal.

The electrode reaction is thought to be represented by

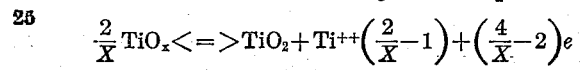

This requires that the logarithm of the interstitial oxygen content be a linear function of the E.M.F. and I have found this to be so.

Figure 1 is a curve showing the relation of oxygen content of pure titanium oxygen alloys to the E.M.F. of a cell having one electrode of highly pure titanium (less than .001% oxygen) in an electrolyte like that described above at 1000° C. or entirely in the beta range of the titanium alloys. The oxygen values for this curve were obtained by vacuum fusion analysis and in the case of highly pure titanium these values are accepted as those for interstitial oxygen.

*Example I*

Figure 2:
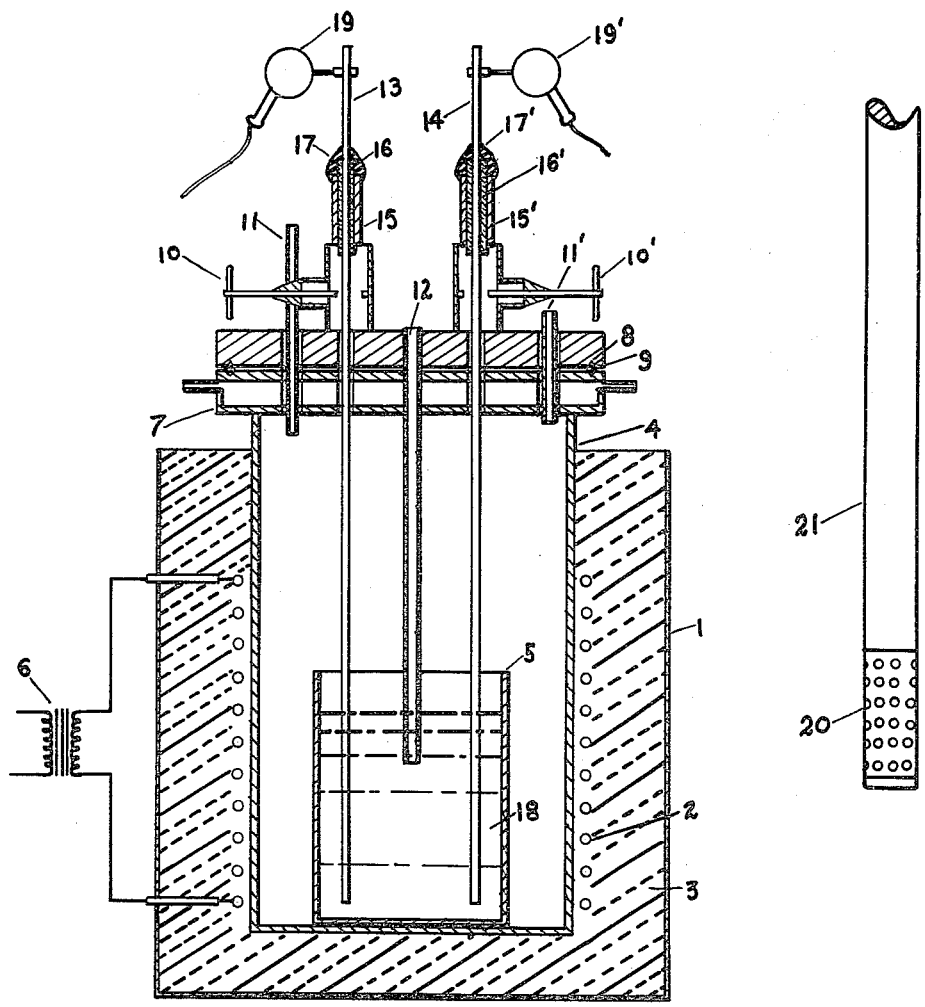

The E.M.F. of titanium-oxygen alloys were measured in a cell of the following construction (Figure 2): The furnace was circular, 12" in diameter and 9" high; the outer shell 1 was made of steel; and the heating element 2 was a six gauge Nichrome V wire made into a helix 4" in diameter and 5" high which rested against a 4" layer of insulating brick 3. The heating unit radiated directly onto a quartz cell 4 which was 3¾" in diameter and 8½" high which in turn acted as the container for a glazed porcelain cell 5 in which the E.M.F. measurements were made. The current for operating the heating unit was supplied by low voltage transformer 6 controlled by a heavy duty variable transformer.

The quartz cell was cemented into a water-cooled flange 7 which was provided with a groove 8 for an O-ring 9. The lid for the cell was of stainless steel six inches in diameter which was fitted with two gate valves 10 and 10¹, argon inlet 11 and outlet 11¹ and thermocouple inlet 12. The electrodes 13 and 14 are introduced to the cell through pipes 15 and 15¹ which are insulated with porcelain tubes 16 and 16¹. The electrodes are cooled at the top of the pipes 15 and 15¹ by means of rubber grommets 17 and 17¹ to allow the maintainance of an inert atmosphere of argon above the electrolyte 18 which had the following composition:

| | Percent |
|---|---|
| Titanium in solution | 3 |
| Titanium chloride (as $TiCl_{2.3}$) | 8.1 |
| Na in solution | 0.1 |
| $TiO_2$ | 1.0 |
| Balance NaCl. | |

A thermocouple was inserted through the thermocouple hole 12 and the electrolyte heated to 900° C. under an atmosphere of argon. The electrode 13, which was a standard titanium electrode with oxygen content of 0.06%, was inserted through the grommet and tube and into the molten electrolyte. The second electrode 14 which was titanium of no known oxygen content was inserted through the second grommet and pipe and into the electrolyte. Vibrators 19, 19¹ were attached to the top of the electrodes and the electrodes were vibrated during the measurement of the E.M.F. A voltmeter sensitive to .5 mv. was used to record the potential of the cell during the time the electrodes were vibrated. Vibration was continued until the voltmeter showed a steady reading for three minutes. A reading of −26 mv. was recorded when the unknown electrode was anode and the .06% $O_2$ electrode was cathode.

From Figure 1, it was determined that the unknown electrode contained about .008% $O_2$. A sample of the same alloy was analyzed by vacuum fusion analysis which showed .01% $O_2$.

*Example II*

The procedure described in Example I was used except that the unknown was a sample of zirconium-oxygen alloy in an electrolyte containing the following composition:

| | Percent |
|---|---|
| Zirconium in solution | 5.0 |
| Zirconium chloride, $ZrCl_{2.5}$ | 9.8 |
| $ZrO_2$ | 1.0 |
| Na in solution | .12 |
| Balance NaCl. | |

The known electrode contained .06% $O_2$ and had previously been standardized against an electrode of very high purity zirconium containing .01% $O_2$. From the E.M.F. value obtained, the percentage of $O_2$ in the unknown zirconium sample was determined to be .022%. This corresponded to a value of .023% $O_2$ as determined by vacuum fusion analysis.

*Example III*

The procedure described in Example I was used except that the unknown sample was composed of fine turnings of titanium-oxygen alloy which were placed in a small perforated iron basket 20, attached to an iron rod 21. The basket and rod were inserted through pipe 15¹. The known electrode of .06% $O_2$ content was placed in pipe 15 as before. The E.M.F. value obtained corresponded to an oxygen content of .018% as compared to a vacuum fusion analysis of .020% $O_2$. In order to eliminate error due to thermal E.M.F. in the cell, the procedure was then repeated with a known sample placed in the perforated steel basket. This sample was of identical composition to the material of the other electrode i.e., .06% $O_2$. An E.M.F. value was obtained which was due to thermal effects and was subtracted from the total reading previously obtained in order to obtain a corrected reading.

What is claimed is:

The method of determining the content of oxygen up to .06% in solid solution in an electrode selected from the group consisting of a metal of groups IV–B, V–B and VI–B and alloys of these metals with Mn, V and Al, which consists in measuring the E.M.F. of a cell having an electrode selected from a group consisting of the pure metal and an oxygen-free alloy of Mn, V and Al and an electrode of the oxygen solid solution to be measured in a cell with an inert atmosphere having an electrolyte consisting essentially of molten sodium chloride having in solution a chloride of mixed valence of the metal and an alkalinous metal then calculating the percent oxygen from the equation $A+B \log_{10}$ percent $O_2$, the constants A and B having been determined by measurements with the same cell and same electrolyte using metals having known contents of oxygen in solid solution.

References Cited in the file of this patent
UNITED STATES PATENTS

| 569,722 | Morrow | Oct. 20, 1896 |
| 2,531,747 | Stearn | Nov. 28, 1950 |
| 2,744,860 | Rines | May 8, 1956 |
| 2,817,631 | Gullett | Mar. 23, 1956 |
| 2,874,454 | Gullett | Feb. 24, 1959 |